US008554702B2

(12) United States Patent
Arunapuram

(10) Patent No.: US 8,554,702 B2
(45) Date of Patent: Oct. 8, 2013

(54) FRAMEWORK FOR OPTIMIZED PACKING OF ITEMS INTO A CONTAINER

(75) Inventor: Sundararajan Arunapuram, West Chester, PA (US)

(73) Assignee: Oracle International Corporation, Redwood Shores, CA (US)

( * ) Notice: Subject to any disclaimer, the term of this patent is extended or adjusted under 35 U.S.C. 154(b) by 279 days.

(21) Appl. No.: 13/111,120

(22) Filed: May 19, 2011

(65) Prior Publication Data

US 2012/0158627 A1 Jun. 21, 2012

Related U.S. Application Data

(60) Provisional application No. 61/424,304, filed on Dec. 17, 2010.

(51) Int. Cl.
*G06F 15/18* (2006.01)
*G06F 7/60* (2006.01)
*G06Q 10/00* (2012.01)
*G06N 99/00* (2010.01)

(52) U.S. Cl.
CPC .................................. *G06N 99/005* (2013.01)
USPC ................................. 706/12; 703/2; 705/1.1

(58) Field of Classification Search
None
See application file for complete search history.

(56) References Cited

U.S. PATENT DOCUMENTS

| 2006/0224423 | A1* | 10/2006 | Sun et al. ........................ 705/7 |
| 2010/0299177 | A1* | 11/2010 | Buczkowski et al. ............. 705/9 |
| 2010/0332599 | A1* | 12/2010 | Tapolcai et al. ............... 709/205 |
| 2011/0029446 | A1* | 2/2011 | Benda et al. .................. 705/330 |
| 2012/0158608 | A1* | 6/2012 | Arunapuram et al. ........ 705/334 |

OTHER PUBLICATIONS

"Oracle Transportation Management"; http://www.oracle.com/us/products/applications/ebusiness/scm/018756.htm; viewed May 13, 2011.

* cited by examiner

*Primary Examiner* — Alan Chen
(74) *Attorney, Agent, or Firm* — Miles & Stockbridge, P.C.

(57) ABSTRACT

One embodiment is directed to a method of optimally packing items into at least one resource. The method includes receiving at least one of items, resources, and parameters, and setting up a set partitioning mixed integer programming (MIP) using the received items, resources, and parameters. The method further includes solving liner programming (LP) relaxation of the MIP, generating new packings, and checking whether new packings have been generated. When no new packings have been generated, solving the final MIP and creating a model of at least one resource packed according to the final MIP.

20 Claims, 11 Drawing Sheets

| CONTAINER OPTIMIZATION ALGORITHM | | |
|---|---|---|
| Parameter | Default Value | Parameter |
| USE 3D BASED LOAD CONFIGURATION | FALSE | TRUE |
| USE COLUMN GENERATION ALGORITHM | FALSE | |
| USE ENUMERATIVE ALGORITHM | FALSE | |
| USE MULTICONTAINER MIP | FALSE | TRUE |
| USE QUICK PACKING ALGORITHM | TRUE | TRUE |
| USE SINGLE CONTAINER MIP | FALSE | |

Fig. 6

| CONTAINER OPTIMIZATION LOAD PLACEMENT | | |
|---|---|---|
| Parameter | Default Value | Parameter Value |
| EMPTY SPACE SORT CRITERIA | 3. Width, Height, Length | 2. Width, Length, Height |
| EVALUATION DEPTH | 0. First Feasible | |
| IS LENGTHWISE ORIENTATION FIRST | TRUE | 3. High |
| ITEM SORT CRITERIA | 0. Largest Volume | |
| LOAD CONFIG VOLUME THRESHOLD | 50.00 | |
| LOAD PLACEMENT ITERATION CRITERIA | 0. Space, Item, Rotation | |
| MAX OVERHANG PERCENT | 0.00 | |
| PLACEMENT COMPARISON SCHEME | 0. Remaining Space Per Item | 2. Occupied Linear Length |
| ROTATION SORT CRITERIA | 0. Upright, Onside, Prone | |

Fig. 7

```xml
<?xml version="1.0" encoding="UTF-8" ?>
<conopt>
<packing_parameters>
<packing_parameter>
   <packing_solver>3D LOAD CONFIG</packing_solver>
   <metric>VOLUME_METRIC</metric>
   <objective>MINIMIZE_COST</objective>
   <desired_utilization>97.0</desired_utilization>
   <max_depth>99999</max_depth>
   <max_timeout>180</max_timeout>
   <column_generation_iterations>10</column_generation_iterations>
   <consider_eru>true</consider_eru>
   <consider_time_windows>false</consider_time_windows>
   <pre_split_packing_items>false</pre_split_packing_items>
   <explore_alternate_schedules>true</explore_alternate_schedules>
   <split_option>SPLIT_OPTION_FAVOR_SPLITTING</split_option>
   <item_sort_criteria>SORT_BY_LARGEST_DENSITY</item_sort_criteria>
   <orient_sort_criteria>UPRIGHT_ONSIDE_PRONE</orient_sort_criteria>
   <is_length_orient_first>false</is_length_orient_first>
   <space_sort_criteria>WIDTH_HEIGHT_LENGTH</space_sort_criteria>
   <isr_iteration_criteria>SPACE_ITEM_ORIENTATION</isr_iteration_criteria>
   <load_config_eval_level>1</load_config_eval_level>
   <load_config_engine>LC_GREEDY_ENGINE</load_config_engine>
   <items_to_place_for_eval>5</items_to_place_for_eval>
   <solutions_per_level>1</solutions_per_level>
   <solutions_to_explore>5</solutions_to_explore>
   <split_penalty>0.1</split_penalty>
   <base_penalty>1000000.0</base_penalty>
   <priority_reward>100.0</priority_reward>
</packing_parameter>
</packing_parameters>
<item_types>
 <item_type>
   <item_type_id>CONOPT.WATER HEATER 04-001</item_type_id>
   <is_cylindrical>false</is_cylindrical>
   <stacking_index>0</stacking_index>
   <max_stacking_height>9.99999999E8</max_stacking_height>
   <max_stacking_layer>99</max_stacking_layer>
   <is_stackable_above>true</is_stackable_above>
   <is_stackable_below>true</is_stackable_below>
   <is_nestable>false</is_nestable>
   <nesting_volume>0.0</nesting_volume>
   <max_nesting_count>0</max_nesting_count>
   <max_unsupported_area_percent>1.0</max_unsupported_area_percent>
 </item_type>
</item_types>
```

FRAMEWORK FOR OPTIMIZED PACKING OF ITEMS INTO A CONTAINER

CROSS REFERENCE TO RELATED APPLICATIONS

This application claims priority from provisional application Ser. No. 61/424,304, filed on Dec. 17, 2010, the contents of which is hereby incorporated by reference in its entirety.

FIELD

One embodiment is directed generally to computerized logistics and, in particular, to logistics for packing items into a transportation container in an optimal manner.

BACKGROUND INFORMATION

Resource allocation generally refers to the assignment of available resources to a task or goal in the most economic or optimal manner. In some instances, resource allocation may include the scheduling of activities and the resources required by those activities while taking into consideration both resource availability and time. As a result, resource allocation may involve the assessment of the value of a resource or of the effects of exploiting a resource. For example, the quantity of a resource may be determined in absolute terms, such as area, or in terms of the ability to utilize it.

One real-world application of resource allocation arises when packing items into a container for shipment on a truck, boat, or airplane. The container has a limited amount of space and is, therefore, a limited resource. It is desirable to be able to pack the most items into the container in the most economical way, while adhering to any constraints or requirements.

A traditional example or implementation of a resource allocation problem is the knapsack problem. The knapsack problem seeks, when given a set of items with a weight and value, to determine the number of each item to include in a collection so that the total weight is less than or equal to a given limit and the total value is as large as possible. For example, there may be n types of items such that each kind of item i has a value $v_i$ and a weight $w_i$, and the maximum weight that can be carried in the bag is W. The knapsack problem can be applied to a number of decision-making processes in different fields including financial applications and cryptography, as well as transportation and packing applications.

However, more complex versions of the knapsack problem, such as those that include items of different sizes, shapes, and types, with different types of equipment for loading the items, and including other packing constraints, require a more enhanced and developed solution.

SUMMARY

One embodiment is directed to a method of optimally packing items into at least one resource. The method includes receiving at least one of items, resources, and parameters, and setting up a set partitioning mixed integer programming (MIP) using the received items, resources, and parameters. The method further includes solving liner programming (LP) relaxation of the MIP, generating new packings, and checking whether new packings have been generated. When no new packings have been generated, solving the final MIP and creating a model of the at least one resource packed according to the final MIP.

BRIEF DESCRIPTION OF THE DRAWINGS

FIG. 6 illustrates a graphical user interface according to one embodiment;

FIG. 7 illustrates a graphical user interface according to an embodiment; and

FIG. 8 illustrates an example of an XML file according to one embodiment.

DETAILED DESCRIPTION

One embodiment is a framework for optimized packing of items into one or more containers. The framework enables the consideration of a number of different business constraints during the packing of items of different sizes, shapes, and types into containers. The business constraints may include adherence to weight and volume requirements, and the dimensions of the container. Embodiments of the invention can meet the needs of different industry verticals that may have different goals, including manufacturers, retailers, freight forwarders, and $3^{rd}$ party logistics providers and carriers.

Previously, different algorithms or multiple flavors of algorithms were needed to satisfy the varying needs of those companies, depending on their specific business need. Because the different algorithms each had their own implementation of the relevant business constraints, they did not scale well when additional business rules and constraints were added. Therefore, certain embodiments provide for the separation of the algorithms from the business rules and constraints. If a new business rule needs to be introduced, the framework simply requires the addition of the new rule, and all the algorithms will immediately be aware of this new rule.

In this description, equipment may be referred to as resources, containers, trailers, or the like. According to certain embodiments, equipment can be anything used to store, transport, or ship items such as goods or products.

Figure 1:
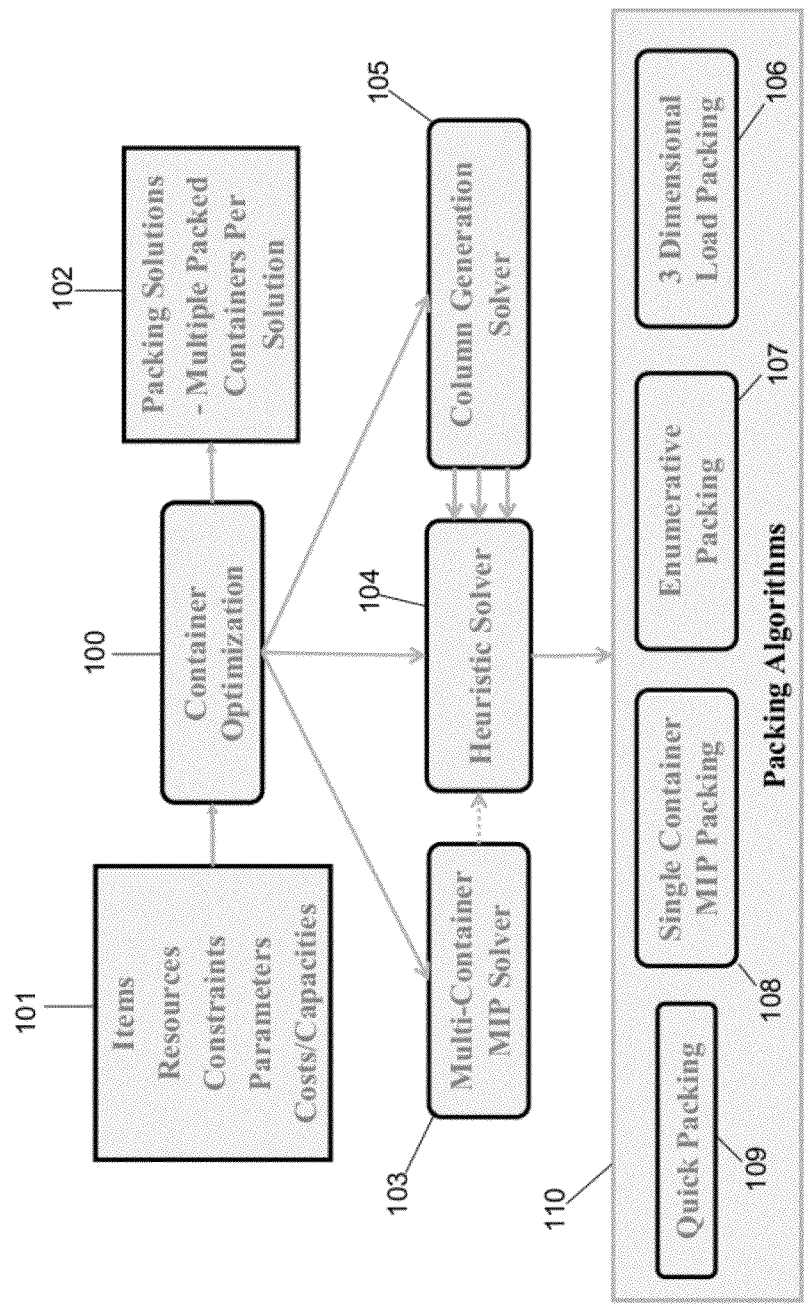
FIG. 1 illustrates a system according to one embodiment of the invention.

FIG. 1 is an example diagram illustrating the components of a system or framework for container optimization according to one embodiment. The system of FIG. 1 may include a container optimization module 100. The container optimization module 100 can take, as input, the different items, resources, constraints, parameters and costs/capacities 101 applicable to the current container optimization problem. The items may include, for example, boxes, packages, cartons, or any other item that may need to be transported. The resources may include containers, trailers, truck beds, or any other equipment that can be used to transport items. The constraints and parameters refer to the different requirements that may be applicable. Based on the received input 101, the container optimization module 100 may then output all the possible packing solutions 102, which may include multiple packed resources per solution.

Container optimization module 100 may invoke different solvers, such as multi-container mixed integer programming (MIP) solver 103, heuristic solver 104, and column generation solver 105, to aid in the selection of the number and type of equipment or containers and to provide the optimal way of packing items into the containers.

Multi-container MIP solver 103 is capable of optimally selecting the right combination of resources or containers to pack a set of items. The objective of multi-container MIP solver 103 may be to minimize the total number of containers used and/or minimize the cost. For each resource or container type, multi-container MIP solver 103 estimates the number of containers of those type that are needed to pack all of the items. Multi-container MIP solver 103 is also able to mix different resource or containers types to provide an estimate that uses more than one type of resource or container. In some embodiments, multi-container MIP solver 103 utilizes heuristic solver 104 with quick packing method 109, which will be discussed in more detail below, to perform the estimation of numbers of resources needed for each resource type. As a result, multi-container MIP solver 103 produces multiple estimates of the number of containers needed depending on the container type.

Multi-container MIP solver 103 may then formulate an assignment problem with side constraint(s) to assign the items in each of the multiple estimates previously produced. The constraints may include, for example, weight, volume, and equipment replaceable units (ERUs), which are discussed in more detail below. The problem is then solved, in one embodiment, using an optimization solver, and producing, as an output, the optimal assignment of items to container(s).

According to certain embodiments, heuristic solver 104 employs different packing methods or algorithms 110 iteratively to simulate the packing of one container at a time. The packing methods 110 may include quick packing 109, single container MIP packing 108, enumerative packing 107, and three dimensional load packing 106. According to an embodiment, heuristic solver 104 is provided with a set of items, set of resources, and a packing method as inputs. Heuristic solver 104 can then find the best fit container for packing. To do so, heuristic solver 104 uses the remaining items to be packed and packs them into each resource type using the provided packing method. Heuristic solver 104 then selects the best packed resource according to a given criteria. For example, the criteria used to determine the best packed resource may include the one that minimizes cost, maximizes utilization, and/or minimizes containers. The best resource as determined according to the selected criteria is then added to a list of packed resources. Heuristic solver 104 repeats the above steps adding packed resources to the list, until there are no more items remaining for packing. When it is determined that no more items remain, heuristic solver 104 returns the packed resource list.

Figure 2:
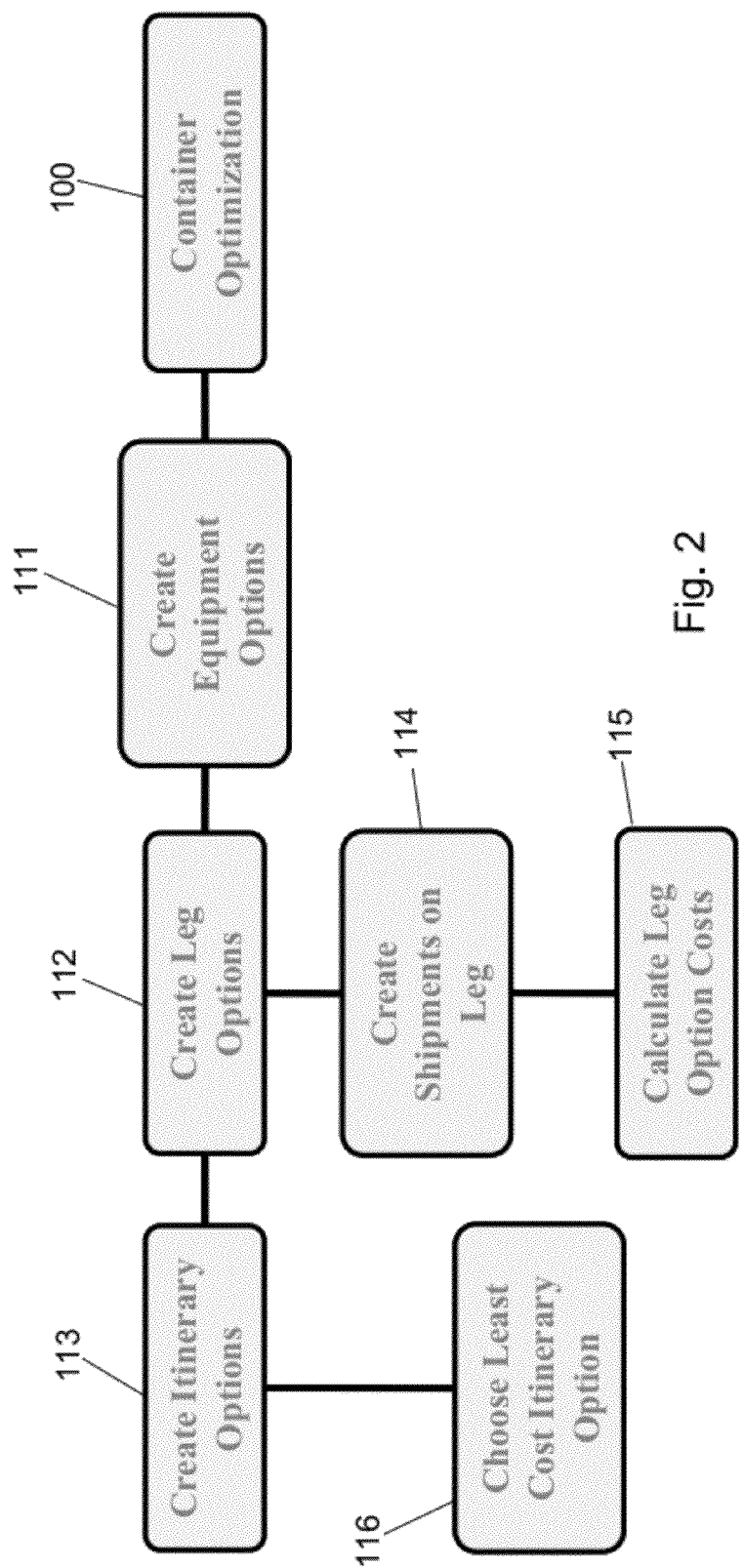
FIG. 2 illustrates a framework for building a shipment according to one embodiment.

FIG. 2 illustrates an embodiment of a framework for building a shipment. FIG. 2 depicts the relationship between container optimization module 100 of FIG. 1 and the other aspects of the shipment building process. In this embodiment, the container optimization that is performed by container optimization module 100 can be performed simultaneously with the creation of equipment options 111, the creation of leg options 112, and the creation of itinerary options 113. For instance, the creation of equipment options 111 can provide different container or trailer options for the shipment. Further, for every option, creation of equipment options 111 may use one of the packing methods or algorithms discussed below to provide the optimized equipment to be used. Creation of leg options 113 may include the creation of shipments for each leg 114 and the calculation of costs for each leg option 115. Creation of itinerary options 113 may include the selection of the itinerary option with the least cost 116.

Figure 3:
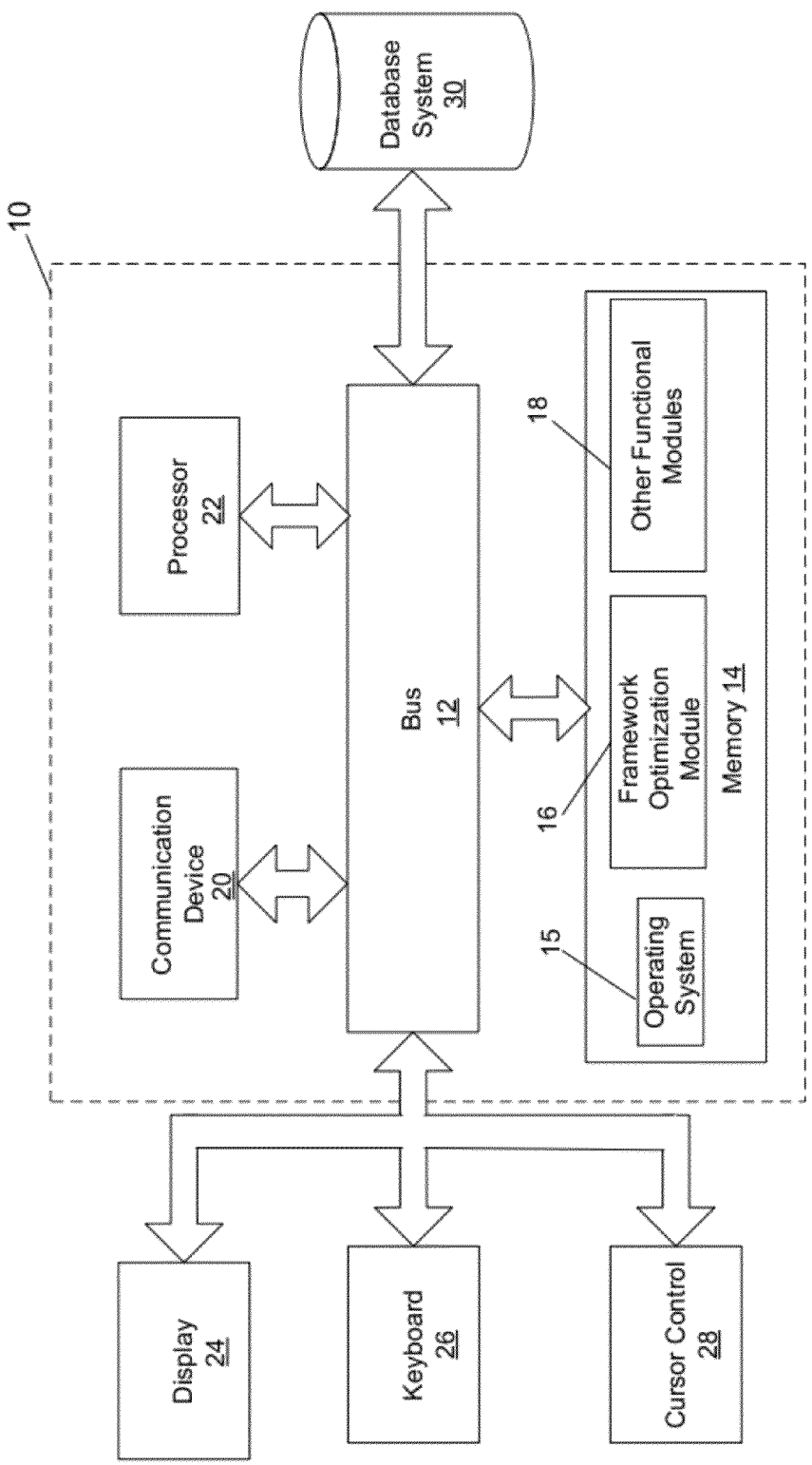
FIG. 3 illustrates a system according to an embodiment.

FIG. 3 illustrates a block diagram of a system 10 that may implement container optimization module 100, according to one embodiment. System 10 includes a bus 12 or other communications mechanism for communicating information between components of system 10. Alternatively, the components of system 10 may communicate with each other directly without the use of bus 12.

System 10 also includes a processor 22, coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer readable media. System 10 further includes a communication device 20, such as a network interface card or other communications interface, to provide access to a network. As a result, a user may interface with system 10 directly or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user, such as the load placement of a container, as will be discussed in more detail below. A keyboard 26 and a cursor control device 28, such as a computer mouse, are further coupled to bus 12 to enable a user to interface with system 10.

Processor 22 and memory 14 may also be coupled via bus 12 to a database system 30 and, thus, may be able to access and retrieve information stored in database system 30. Although only a single database is illustrated in FIG. 1, any number of databases may be used in accordance with certain embodiments. In some embodiments, database system 30 may store information related to items for shipping including their dimensions, weight, volume, destination, and any other relevant attributes. Database system 30 may store information related to resources, such as containers, including their size, dimensions, and attributes including any obstructions, etc.

In one embodiment, memory 14 stores software modules that provide functionality when executed by processor 22. The modules may include an operating system 15 that provides operating system functionality for system 10. The memory may also store a framework optimization module 16, which provides a framework for easily using or incorporating any of a plurality of packing methods, such as three dimensional load packing 106, quick packing 104, single container MIP packing 108, and enumerative packing 107 of FIG. 1. Any other packing method or algorithms may also be incorporated by framework optimization module 16.

System 10 may also include one or more other functional modules 18 to provide additional functionality. For example, functional modules 18 may include a transportation management system capable of facilitating the planning and building of shipments. In one embodiment, functional modules 18 may include, for instance, the Oracle Transportation Management (OTM) system from Oracle Corporation.

Database system 30 may include a database server and any type of database, such as a relational or flat file database.

Database system 30 may store attributes related to items and containers, as well as constraints provided by the transportation management system or a user. Database system 30 may also store any other data required by the framework optimization module 16, or data associated with system 10 and its associated modules and components.

In certain embodiments, processor 22, framework optimization module 16, and other functional modules 18 may be implemented as separate physical and logical units or may be implemented in a single physical and logical unit. Furthermore, in some embodiments, processor 22, framework optimization module 16, and other functional modules 18 may be implemented in hardware, or as any suitable combination of hardware and software.

Returning to FIG. 1, according to certain embodiments, the packing methods 110 include quick packing 109, single container MIP packing 108, enumerative packing 107, and three dimensional load packing 106. Quick packing 109 receives, as input, a resource or container and a list of items to be packed into the container. Quick packing 109 packs each item in the list by checking if the item is compatible with the container and/or if the item fits into the container. If so, the item is added to the container. If the item cannot fit entirely, quick packing 109 identifies the largest split of the item that can fit in the container and splits the item accordingly to pack in the container. Once all items in the list have been packed, quick packing 109 returns the packed resource. Quick packing 109 can generally produce the fastest result of the packing methods 110.

Enumerative packing 107 receives, as input, a resource or container and a list of items to be packed into that container. Enumerative packing 107 then solves the problem of packing the container with the items by formulating a knapsack problem with weight, volume, and ERU constraints. Enumerative packing 107 can then solve the formulated knapsack problem, in one embodiment, using an optimization solver that is configured to solve numerically difficult or unstable problems, such as linear or mixed integer problems. The result of enumerative packing 107 is a tightly packed container.

Single container MIP packing 108 also receives, as input, a resource or container and a list of items to be packed into that container. Single container MIP packing 108 then formulates the problem as a dynamic programming (DP) problem and, using DP recursion, adds items to the container so as to maximize utilization. The result of single container MIP packing 108 is a tightly packed container.

Three dimensional load packing 106 may also receive, as input, a resource or container and a list of items to be packed into that container. In addition to weight, volume, and ERUs, three dimensional load packing 106 can take into account the dimensions of the container(s) and items. For instance, the items may be rectangular shaped, cylindrical shaped, or any other shaped item. Using a three dimensional placement algorithm, three dimensional load packing 106 can place one item at a time in the container(s). While placing each item, three dimensional load packing 106 logic can ensure that any placement constraints, in addition to the weight and volume constraints, are met. As a result, three dimensional load packing 106 can determine the exact position where each item should be placed in the container.

Therefore, three dimensional load packing 106 can provide three dimensional model or simulation of different shaped items efficiently loaded into different shaped containers of given dimensions. In addition, three dimensional load packing 106 provides a user with multiple ways to specify how items should be sorted to form a sequence to be loaded and also provides the user with a mechanism to specify how spaces in a container are evaluated. For example, the user could specify that the items need to be sorted in the decreasing order of their volumes. In this case, the largest piece in terms of volume is placed first and the smallest one is placed at the end. The advantage of such an approach is that once the bigger objects are placed, the smaller objects are more likely to fit in the space left over after placing the larger objects and thereby result in a tight packing. The user may also specify the sorting based on the largest dimension instead of volume. This would give the users freedom to choose the best way to sort the objects based upon their business requirements or preferences.

FIGS. 4, and 5a-5d illustrate flow diagrams of the functionality of container optimization module 100, according to an embodiment. It should be noted that the functionality of the flow diagrams depicted in FIGS. 4, and 5a-5d can be implemented by software stored in memory or other computer readable or tangible media, and executed by a processor. In other embodiments, the functionality can be executed by hardware (e.g., through the use of an application specific integrated circuit (ASIC), a programmable gate array (PGA), a field programmable gate array (FPGA), or any combination of software and hardware.

Figure 4:
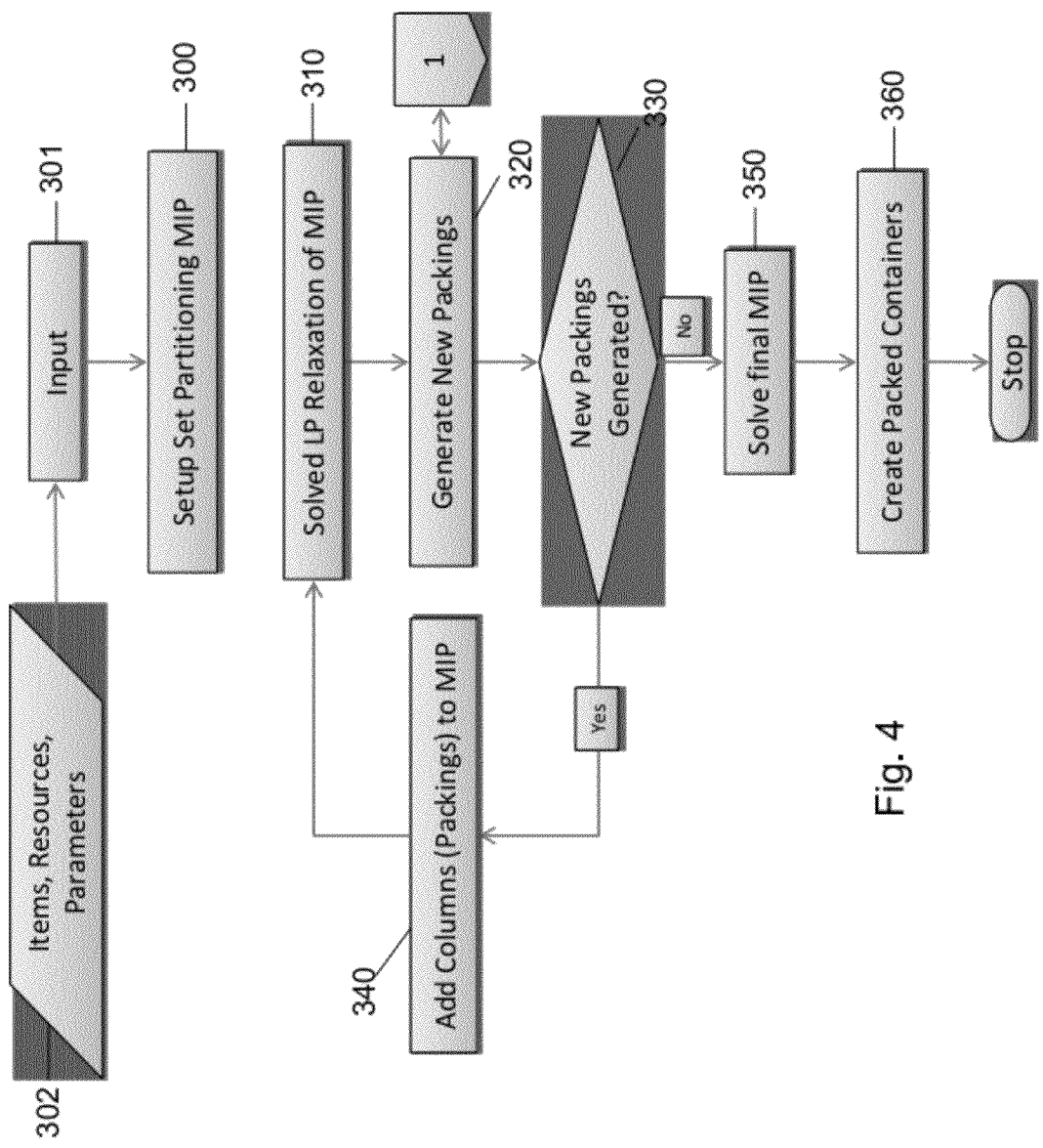
FIG. 4 illustrates a flow diagram of a method according to an embodiment.

FIG. 4 illustrates a flow diagram of a method that may be performed by container optimization module 100 utilizing column generation solver 105, according to an embodiment. At 300, the method includes setting up a set partitioning mixed integer programming (MIP) using items, resources, and parameters 302 as inputs 301. The setting up of the set partitioning MIP may include setting up the objective function based on an objective of the packing, such as minimizing cost or maximizing utilization of resources. Additionally, the setting up of the set partitioning MIP may also include setting up the constraints, such as ensuring that every item is packed into at least one resource, and that items or resources do not exceed weight, volume, and/or capacity requirements.

At 310, the method includes solving the linear programming (LP) relaxation of the MIP. At 320, the method includes generating new packed resource columns (packings). A packing refers to the placement of an item into a resource. Each new packing is represented in the MIP by a column. The column can include the cost of that packing, as well as an identification of the item and resource into which it is packed. At 330, the method includes checking whether new packings have been generated. If new packings have been generated, a column representing the new packing is added to MIP at 340 and the method returns to 310. If no new packings are generated, then the method proceeds to 350 and solves the final MIP. The solving of the final MIP results in a selection of the best resource(s) for packing the items. Then, at 360, the packed containers are created. The generating of new packings 320 may include invoking heuristic solver 104 to use one of the packing methods 110 mentioned above.

Figure 5A:
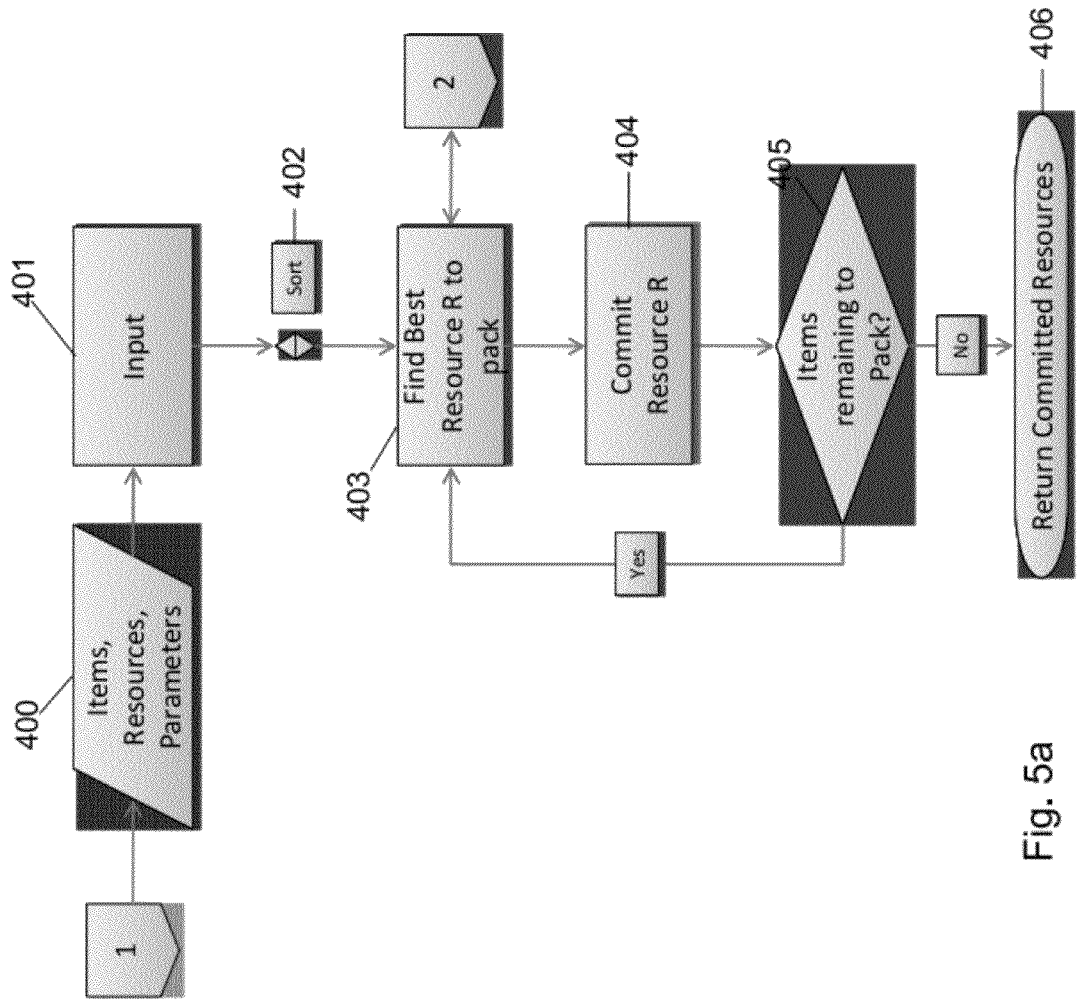
FIG. 5a illustrates a flow diagram of a method according to an embodiment.

FIGS. 5a-5d illustrates an example of a method that may be performed by container optimization module 100 utilizing heuristic solver 104, according to one embodiment. As illustrated in FIG. 5a, the method begins with receiving items, resources, parameters 400 as input 401, and sorting the input at 402. At 403, the method includes finding the best resource to pack. Finding the best resource to pack may include generating several different packing options and selecting the best one based on the objective, for example. A process for finding the best resource to pack will be discussed in more detail below in connection with FIG. 5b. Once the best resource to pack is found, the method includes, at 404, committing the resource. At 405, it is determined whether there are remaining items to pack. If there are remaining items, the method returns to 403 to find the best resource. If there are not remaining items, the method returns the committed resource at 406.

Figure 5B:
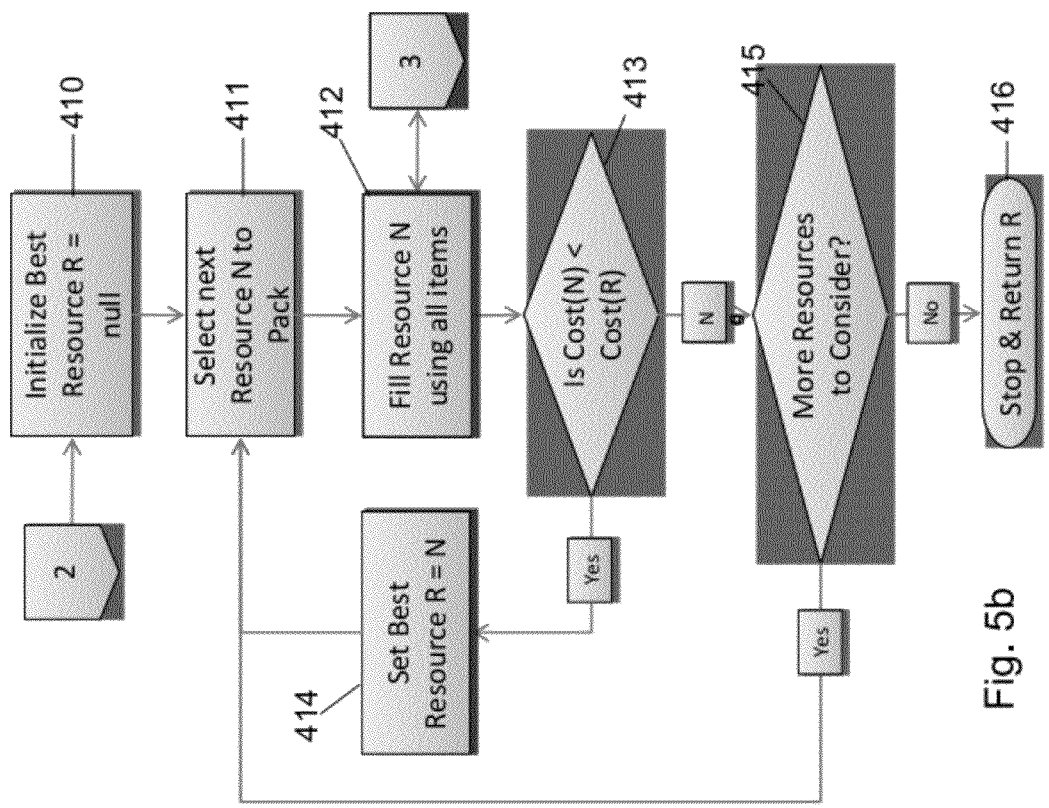
FIG. 5b illustrates a flow diagram of a method according to an embodiment.

FIG. 5b illustrates a flow diagram of a method of finding the best resource to pack (403 of FIG. 5a), according to an embodiment. The method includes, at 410, first initializing the best resource to null. At 411, the method includes selecting the next resource to pack and, at 412, filling the resource using all items. A process for filling the resource using all items will be discussed below in reference to FIG. 5c. Once the resource is filled, at 413, the method includes determining whether the cost of the resource is less than the cost of the best resource. If the cost of the resource is less than the cost of the best resource, then the resource is set as the best resource at 414. If the cost of the resource is greater than the cost of the best resource, then at 415 it is determined whether there are more resources to consider. If there are more resources, then the method returns to 411 and selects the next resource. If there are not more resources, then, at 416, the method stops and returns the best resource as determined by the method.

Figure 5C:
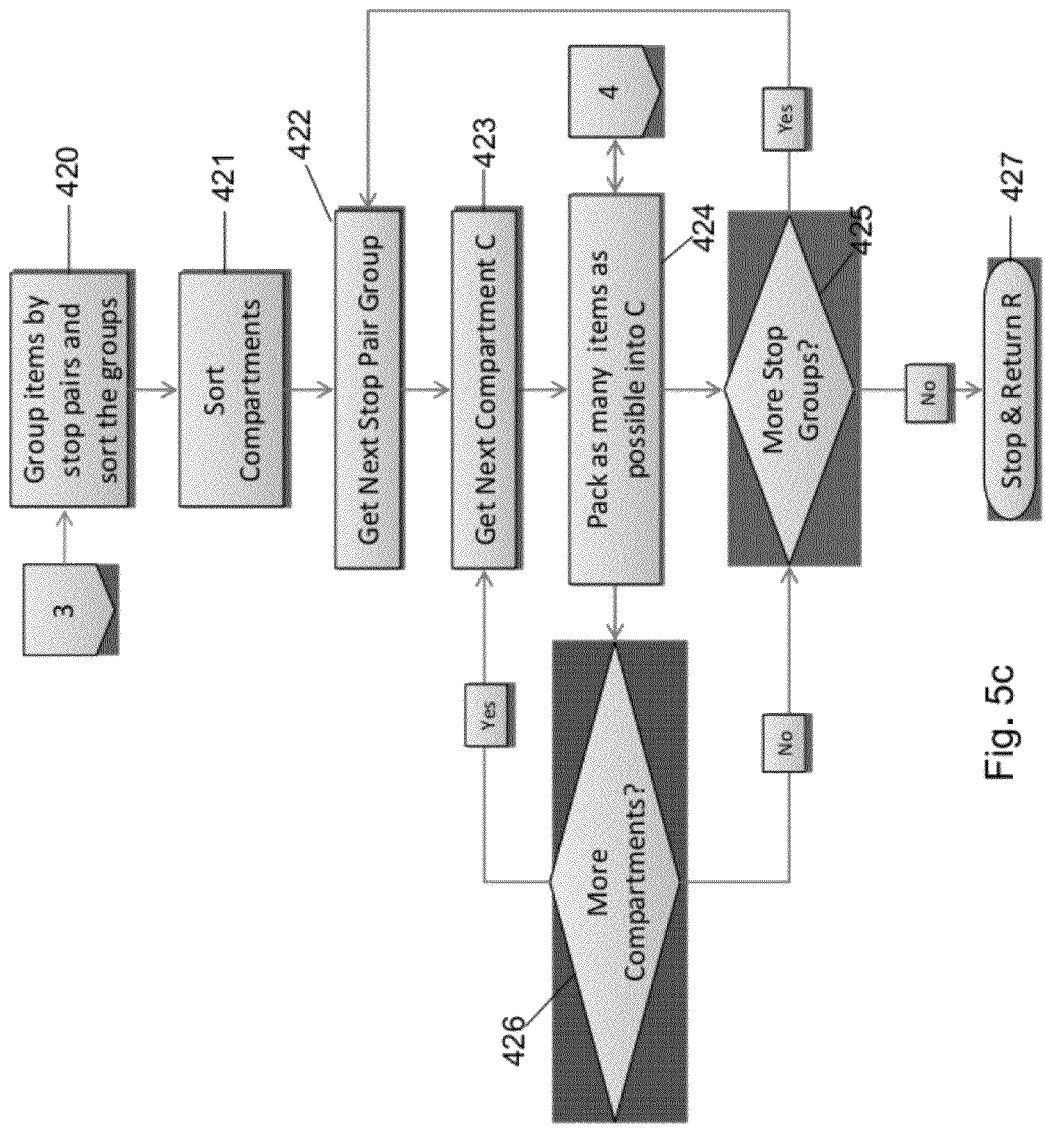
FIG. 5c illustrates a flow diagram of a method according to an embodiment.

FIG. 5c illustrates a flow diagram of a method of filling a selected resource (412 of FIG. 5b), according to one embodiment. The method includes, at 420, grouping the items by stop pairs and sorting the groups. For example, items that are to be shipped from point A to point B are grouped together, and items that are to be shipped from point A to point C are grouped together, etc. At 421, the method includes sorting the compartments of a resource. A container or trailer may have different compartments with different characteristics to hold different types of goods. At 422, the method includes retrieving the next stop pair group and, at 423 retrieving the next compartment. At 424, the method includes packing as many items as possible from the stop pair group into the compartment. A process for packing the items into a compartment will be discussed below in connection with FIG. 5d. At 426, it is determined whether there are more compartments to pack and, if so, returning to 423 to retrieve the next compartment. If there are no more compartments to pack, the method continues to 425 where it is determined whether there are more stop groups to pack. If there are more stop groups, then the method returns to 422 to retrieve the next stop group. If there are no more stop groups, then the method stops and returns the packed resource at 427.

Figure 5D:
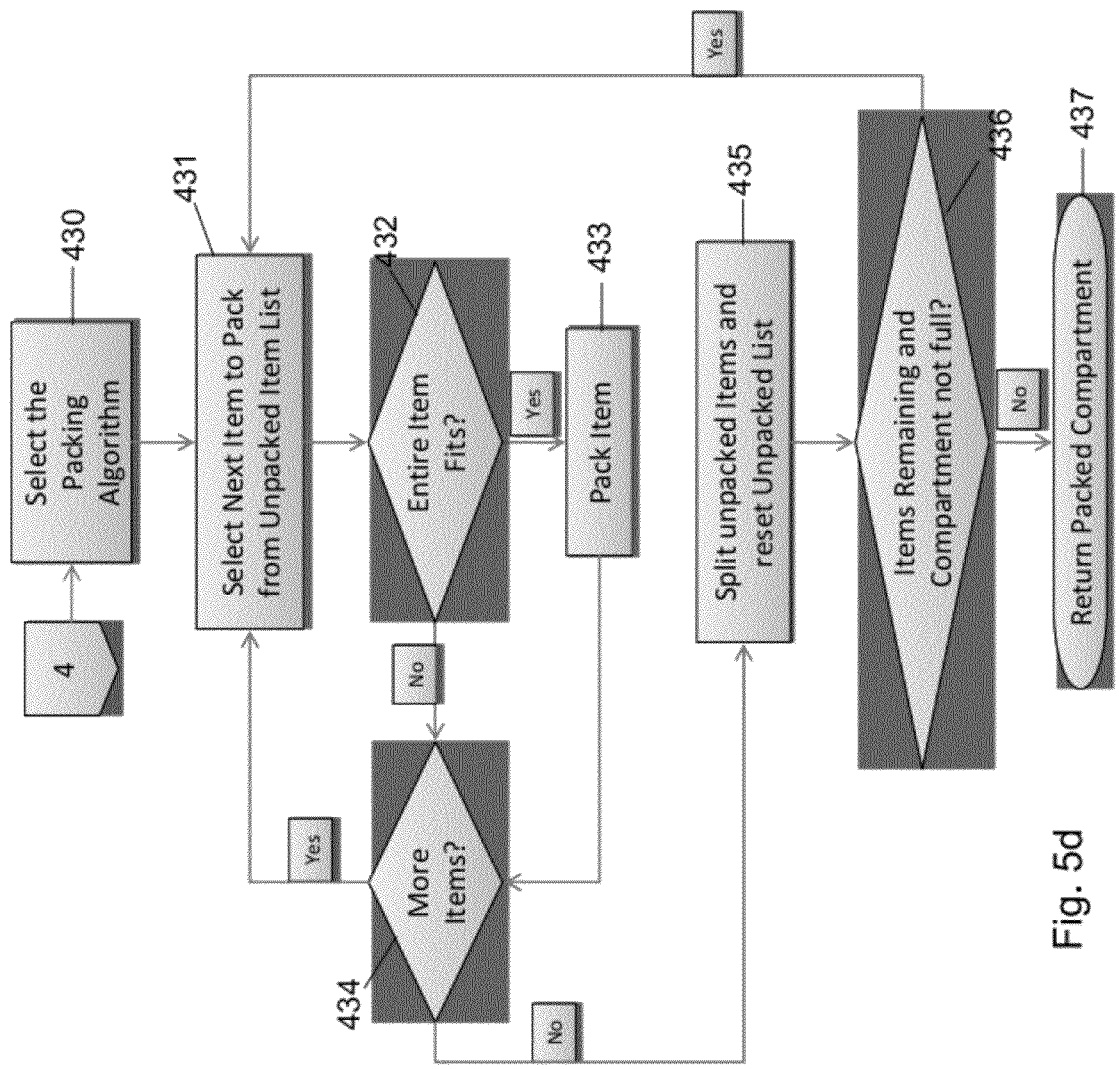
FIG. 5d illustrates a flow diagram of a method according to an embodiment.

FIG. 5d illustrates a flow diagram of a method of packing items into a compartment (424 of FIG. 5c), according to an embodiment. The method includes, at 430, selecting a packing method or algorithm to perform the packing. The selected packing method may be one of the packing methods or algorithms 110 discussed above, or any other algorithm that can take a resource and pack it with items. Thus, other packing methods or algorithms can be incorporated, and embodiments of the invention are not limited to the packing methods or algorithms 110 illustrated in FIG. 1. As a result, embodiments of the invention can incorporate and support multiple algorithms, thereby making it flexible and expandable.

At 431, the method includes selecting the next item to pack from an unpacked item list. At 432, it is determined whether the entire selected item fits. If it does fit, then the item is packed at 433. If the item does not fit, then it is determined whether there are more items in the unpacked item list at 434. If there are more items, then the method returns to 431 to select the next item. If there are not more items, then the method includes splitting the unpacked items and resetting the unpacked item list to reflect the split items at 435. The method continues, at 436, by determining whether there are items remaining in the unpacked item list and the compartment is not full. If there are remaining items and the compartment is not full, then the method returns to 431 to select the next item. If there are no items remaining or the compartment is full, then the method returns the packed compartment at 437.

Several parameters can be specified by a user to customize container optimization module 100 and its output. One example are the load configuration parameters. The load configuration parameters include a load placement iteration criteria that specifies the emphasis for spaces on the container, items to be packed on the container, and the rotation(s) or orientation of the item. The load placement iteration criteria may determine which of the spaces, items, and rotations is considered first when one of the packing methods 110 is modeling the loading of a container. Possible values for the load placement iteration criteria include: [space, item, rotation], [space, rotation, item], [item, space, rotation], [item, rotation, space], [rotation, item, space], and [rotation, space, item].

For instance, if the load placement iteration criteria indicates [space, item, rotation], the space is selected first and then items will be attempted to be placed into the selected space in different orientations (rotations). As another example, if the load placement iteration criteria indicates [item, rotation, space], an item is selected first, followed by a rotation, and then an appropriate space will be determined that can fit the already selected item and rotation. Further, if the load placement iteration criteria indicates [item, space, rotation], an item is selected first, followed by a space, and then an appropriate rotation for the item and space is determined. Generally, an item will have rotations equal to the number of its sides. For example, a box would have six possible rotations.

The load configuration parameters can also include sorting criteria for the items, spaces, and rotations. For example, an empty space sort criteria specifies the sort criteria for empty spaces. In other words, the empty space sort criteria helps determine which of the empty spaces in an empty space list are selected first. Therefore, the empty space sort criteria has an influence on where the next item will be placed in the container. Possible values for the empty space sort criteria include: [width, height, length], [width, length, height], [height, width, length], [height, length, width], [length, height, width], [length, width, height]. An item sort criteria specifies the sort criteria for items. In one embodiment, a user may set the item sort criteria to sort items by largest volume, largest surface, largest dimension, most dense, and/or stacking index. For example, if the item sort criteria is set to largest volume, then the item with the largest volume will be selected first from the unpacked item list.

A rotation sort criteria specifies the sort criteria for rotations. In other words, the rotation sort criteria specifies which rotation will be attempted first. Possible values for the rotation sort criteria include: [upright, onside, prone], [upright, prone, onside], [onside, upright, prone], [onside, prone, upright], [prone, upright, onside], and [prone, onside, upright].

Furthermore, an evaluation depth can be specified to the three dimensional load packing algorithm 106. The evaluation depth indicates how much control the user would like to maintain over the modeling process. Possible values include 0 to 3, with 0 meaning that the user has full control and 3 meaning full evaluation by the three dimensional load packing algorithm 106.

FIG. 6 illustrates an example of a graphical user interface that can be used to activate or de-activate the different packing methods/algorithms 110 depicted in FIG. 1. The user interface includes a parameter column 500 listing the container optimization options/parameters, and a default value column 501 listing the default value for each of the options. Initially, the default value is set to false for each of the options and, therefore, they are de-activated. Parameter column 502 provides a user interface control that allows a user to change the value associated with the container optimization method to true. When the value is changed to true, the associated container optimization method is activated. In this example, three dimensional load packing 503, multi-container MIP 504, and quick packing 505 are activated.

FIG. 7 illustrates an example of a graphical user interface that can be used to modify or set various parameters, such as the load configuration parameters discussed above. The user interface includes a parameter column 510 listing the available parameters, a default value column 511 listing the default values for each of the listed parameters, and a parameter value column 512 that provides a user interface control to allow a user to change the value of the parameter. In the example shown in FIG. 7, the empty space sort criteria 513 has a default value of [width, height, length], but the current value of the empty space sort criteria 513 has been changed to [width, length, height], as indicated in column 512. Also, in the example of FIG. 7, the evaluation depth parameter 514 has a default value of 0, which means that the selected packing method will return the first feasible result. However, the current value of the evaluation depth parameter 514 has been changed to high as shown in column 512, which means that the selected packing method will look for multiple feasible results and return the optimal one.

Further, according to some embodiments, an extensible markup language (XML) file can be used to provide the data (e.g., inputs 101) to container optimization module 100. FIG. 8 illustrates an example of a portion of an XML file that may be used to provide data to container optimization module 100. As shown in FIG. 8, line 800 indicates the packing method to be used between the tags "<packing_solver>" and "</packing_solver>". In this example, the packing method used is three dimensional load configuration, identified as "3D LOAD CONFIG". Similarly, line 810 indicates the objective of the optimization between the tags "<objective>" and "</objective>". According to this example, the objective is to minimize cost, which is identified as "MINIMIZE_COST" in FIG. 8. The XML file illustrated in FIG. 8 also identifies various other parameters and/or constraints to be applied to the container optimization.

In view of the above, embodiments of the invention are able to optimize the equipment used for transporting items and also optimize the way that items are loaded into the equipment. Additionally, embodiments of the invention have the advantage of allowing users to customize the loading of items and the selection of equipment to suit their specific requirements. This is because embodiments of the invention are able to handle a number of business constraints. Further, embodiments of the invention can also handle load configuration specific constraints, such as curved roof, door height, stacking height, floor loading, stacking layer feasibility, overhang constraint, load bearing weight, orientation feasibility, and stacking index constraints.

It should be noted that many of the functional features described in this specification have been presented as modules, applications or the like, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be partially implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve its stated purpose.

Indeed, a module of executable code or algorithm could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium storing instructions that, when executed by a processor, perform a process for optimally packing items into at least one resource, the process comprising:
   receiving at least one of items, resources, or parameters;
   setting up a set partitioning mixed integer programming (MIP) using the received items, resources, or parameters;
   solving a linear programming (LP) relaxation of the MIP;
   generating new packings;
   checking whether new packings have been generated;
   when no new packings have been generated,
      solving a final MIP; and
      creating a model of the at least one resource packed according to the final MIP.

2. The computer readable medium according to claim 1, further comprising:
   when new packings have been generated, adding the new packings to the MIP.

3. The computer readable medium according to claim 1, wherein the generating comprises:
   sorting the received items, resources, or parameters;
   determining at least one resource from the resources as a best resource for packing the items;
   committing the at least one resource;
   determining whether there are remaining items to pack;
   if there are remaining items, performing the determining of the best resource again, and
   if there are no remaining items, returning the committed at least one resource.

4. The computer readable medium according to claim 3, wherein the determining the best resource comprises:
   initializing the best resource to null;
   selecting a next resource to pack;
   filling the selected resource using all the items;

determining whether a cost of the selected resource is less than the cost of the best resource;
if the cost of the selected resource is less than the cost of the best resource, setting the selected resource as the best resource;
if the cost of the selected resource is greater than the cost of the best resource, determining whether there are more resources to consider, and, if there are more resources, returning the method to the selecting;
if there are no more resources, returning the best resource.

5. The computer readable medium according to claim 4, wherein the filling comprises:
grouping the items by stop pairs and sorting the groups;
sorting compartments of the selected resource;
packing as many items as possible from the stop pair group into the compartment;
determining whether there are more compartments to pack and, if so, retrieving the next compartment;
when there are no more compartments to pack, determining whether there are more stop pair groups to pack;
when there are more stop pair groups, retrieving the next stop pair group; and
when there are no more stop pair groups, returning the packed resource.

6. The computer readable medium according to claim 5, wherein the packing comprises:
selecting at least one of a plurality of packing methods, the packing methods comprising at least one of quick packing, single container MIP packing, enumerative packing, or three dimensional load packing;
selecting a next item to pack from an unpacked item list;
determining whether the entire selected item fits in the selected resource;
if the selected item fits, packing the item in the selected resource;
if the selected item does not fit,
  determining whether there are more items in the unpacked item list,
  if there are more items in the unpacked item list, returning the method to the selecting of the next item,
  if there are no more items, splitting the unpacked items and resetting the unpacked item list to reflect the split items;
determining whether there are items remaining in the unpacked item list and the compartment is not full;
if there are remaining items and the compartment is not full, returning the method to the selecting of the next item;
if there are no items remaining or the compartment is full, returning the packed compartment.

7. An apparatus, comprising:
at least one processor; and
at least one memory including computer program code,
the at least one memory and the computer program code configured, with the at least on processor, to cause the apparatus at least to
receive at least one of items, resources, or parameters;
setup a set partitioning mixed integer programming (MIP) using the received items, resources, or parameters;
solve a linear programming (LP) relaxation of the MIP;
generate new packings;
check whether new packings have been generated;
when no new packings have been generated,
  solve a final MIP; and
  create a model of the at least one resource packed according to the final MIP.

8. The apparatus according to claim 7, wherein, when new packings have been generated, the at least one memory and the computer program code are further configured, with the at least on processor, to cause the apparatus to add the new packings to the MIP.

9. The apparatus according to claim 7, wherein the at least one memory and the computer program code are further configured, with the at least on processor, to cause the apparatus to generate new packings by:
sorting the received items, resources, or parameters;
determining at least one resource from the resources as a best resource for packing the items;
committing the at least one resource;
determining whether there are remaining items to pack;
if there are remaining items, performing the determining of the best resource again, and
if there are no remaining items, returning the committed at least one resource.

10. The apparatus according to claim 9, wherein the at least one memory and the computer program code are further configured, with the at least on processor, to cause the apparatus to determine the best resource by:
initializing the best resource to null;
selecting a next resource to pack;
filling the selected resource using all the items;
determining whether a cost of the selected resource is less than the cost of the best resource;
if the cost of the selected resource is less than the cost of the best resource, setting the selected resource as the best resource;
if the cost of the selected resource is greater than the cost of the best resource, determining whether there are more resources to consider, and, if there are more resources, returning the method to the selecting;
if there are no more resources, returning the best resource.

11. The apparatus according to claim 10, wherein the at least one memory and the computer program code are further configured, with the at least one processor, to cause the apparatus to fill the selected resource by:
grouping the items by stop pairs and sorting the groups;
sorting compartments of the selected resource;
packing as many items as possible from the stop pair group into the compartment;
determining whether there are more compartments to pack and, if so, retrieving the next compartment;
when there are no more compartments to pack, determining whether there are more stop pair groups to pack;
when there are more stop pair groups, retrieving the next stop pair group; and
when there are no more stop pair groups, returning the packed resource.

12. A computer-implemented method of optimally packing items into at least one resource, the method comprising:
receiving at least one of items, resources, or parameters;
setting up a set partitioning mixed integer programming (MIP) using the received items, resources, or parameters;
solving a linear programming (LP) relaxation of the MIP;
generating new packings;
checking whether new packings have been generated;
when no new packings have been generated,
  solving a final MIP; and
  creating a model of the at least one resource packed according to the final MIP.

13. The method according to claim 12, further comprising:
when new packings have been generated, adding the new packings to the MIP.

14. The method according to claim 12, wherein the generating comprises:
   sorting the received items, resources, and parameters;
   determining at least one resource from the resources as a best resource for packing the items;
   committing the at least one resource;
   determining whether there are remaining items to pack;
   if there are remaining items, performing the determining of the best resource again, and
   if there are no remaining items, returning the committed at least one resource.

15. The apparatus according to claim 11, wherein the at least one memory and the computer program code are further configured, with the at least one processor, to cause the apparatus to pack by:
   selecting at least one of a plurality of packing methods, the packing methods comprising at least one of quick packing, single container MIP packing, enumerative packing, or three dimensional load packing;
   selecting a next item to pack from an unpacked item list;
   determining whether the entire selected item fits in the selected resource;
   if the selected item fits, packing the item in the selected resource;
   if the selected item does not fit,
      determining whether there are more items in the unpacked item list,
      if there are more items in the unpacked item list, returning the method to the selecting of the next item,
      if there are no more items, splitting the unpacked items and resetting the unpacked item list to reflect the split items;
   determining whether there are items remaining in the unpacked item list and the compartment is not full;
   if there are remaining items and the compartment is not full, returning the method to the selecting of the next item;
   if there are no items remaining or the compartment is full, returning the packed compartment.

16. The method according to claim 14, wherein determining the best resource comprises:
   initializing the best resource to null;
   selecting a next resource to pack;
   filling the selected resource using all the items;
   determining whether a cost of the selected resource is less than the cost of the best resource;
   if the cost of the selected resource is less than the cost of the best resource, setting the selected resource as the best resource;
   if the cost of the selected resource is greater than the cost of the best resource, determining whether there are more resources to consider, and, if there are more resources, returning the method to the selecting;
   if there are no more resources, returning the best resource.

17. The method according to claim 16, wherein the filling comprises:
   grouping the items by stop pairs and sorting the groups;
   sorting compartments of the selected resource;
   packing as many items as possible from the stop pair group into the compartment;
   determining whether there are more compartments to pack and, if so, retrieving the next compartment;
   when there are no more compartments to pack, determining whether there are more stop pair groups to pack;
   when there are more stop pair groups, retrieving the next stop pair group; and
   when there are no more stop pair groups, returning the packed resource.

18. The method according to claim 17, wherein the packing comprises:
   selecting at least one of a plurality of packing methods, the packing methods comprising at least one of quick packing, single container MIP packing, enumerative packing, or three dimensional load packing;
   selecting a next item to pack from an unpacked item list;
   determining whether the entire selected item fits in the selected resource;
   if the selected item fits, packing the item in the selected resource;
   if the selected item does not fit,
      determining whether there are more items in the unpacked item list,
      if there are more items in the unpacked item list, returning the method to the selecting of the next item,
      if there are no more items, splitting the unpacked items and resetting the unpacked item list to reflect the split items;
   determining whether there are items remaining in the unpacked item list and the compartment is not full;
   if there are remaining items and the compartment is not full, returning the method to the selecting of the next item; and
   if there are no items remaining or the compartment is full, returning the packed compartment.

19. The apparatus according to claim 7, further comprising a framework optimization module that incorporates at least one packing method.

20. The apparatus according to claim 19, wherein said at least one packing method includes a three dimensional load packing method, a quick packing method, a single container MIP packing method, or an enumerative packing method.

* * * * *

UNITED STATES PATENT AND TRADEMARK OFFICE
CERTIFICATE OF CORRECTION

| | | |
|---|---|---|
| PATENT NO. | : 8,554,702 B2 | Page 1 of 1 |
| APPLICATION NO. | : 13/111120 | |
| DATED | : October 8, 2013 | |
| INVENTOR(S) | : Arunapuram | |

It is certified that error appears in the above-identified patent and that said Letters Patent is hereby corrected as shown below:

In the Specification

In column 6, line 23, delete "hardware." and insert -- hardware). --, therefor.

In the Claims

In column 11, line 56, in Claim 7, after "least" delete "on" and insert -- one --, therefor.

In column 12, line 4, in Claim 8, after "least" delete "on" and insert -- one --, therefor.

In column 12, line 8, in Claim 9, after "least" delete "on" and insert -- one --, therefor.

In column 12, line 21, in Claim 10, after "least" delete "on" and insert -- one --, therefor.

Signed and Sealed this
Eighteenth Day of February, 2014

Michelle K. Lee
*Deputy Director of the United States Patent and Trademark Office*